United States Patent [19]
Ittycheriah et al.

[11] Patent Number: 5,895,447
[45] Date of Patent: Apr. 20, 1999

[54] SPEECH RECOGNITION USING THRESHOLDED SPEAKER CLASS MODEL SELECTION OR MODEL ADAPTATION

[75] Inventors: Abraham Poovakunnel Ittycheriah; Stephane Herman Maes, both of Danbury, Conn.

[73] Assignee: International Business Machines Corporation, Armonk, N.Y.

[21] Appl. No.: 08/787,031

[22] Filed: Jan. 28, 1997

Related U.S. Application Data

[60] Provisional application No. 60/011,058, Feb. 2, 1996.

[51] Int. Cl.$^6$ ........................................... G01L 9/06
[52] U.S. Cl. ..................... 704/231; 704/246; 704/251
[58] Field of Search ............................ 704/231, 246, 704/251, 275

[56] References Cited

U.S. PATENT DOCUMENTS

| | | | |
|---|---|---|---|
| Re. 31,188 | 3/1983 | Pirz et al. | 704/252 |
| 4,181,821 | 1/1980 | Pirz et al. | 704/252 |
| 4,363,102 | 12/1982 | Holmgren et al. | 704/238 |
| 5,165,095 | 11/1992 | Borcherding | 379/88 |
| 5,608,840 | 3/1997 | Tsuboka | 704/236 |
| 5,608,841 | 3/1997 | Tsuboka | 704/256 |
| 5,638,489 | 6/1997 | Tsuboka | 704/256 |

FOREIGN PATENT DOCUMENTS

| | | | |
|---|---|---|---|
| 831456 A2 | 3/1998 | European Pat. Off. | G10L 3/00 |
| 409258769 | 10/1997 | Japan | G10L 3/00 |

OTHER PUBLICATIONS

Tetsuo Kosaka and Shigeki Sagayama, "Tree–Structured Speaker Clustering for Fast Speaker Adaptation," Proc. ICASSP 94, vol. I, pp. 245–248, May 1994.

Ananth Sankar, Francoise Beaufays, and Vassilios Digalakis, "Training Data Clustering for Improved Speech Recognition," Proc. Eurospeech 95, pp. 503–506, Sep. 1995.

Mukund Padmanabhan, Lalit R. Bahl, David Nahamoo, and Michael A. Picheny, "Speaker Clustering and Transformation for Speaker Adaptation in Large–Vocabulary Speech Recognition Systems," Proc. ICASSP 96, vol. II, pp. 701–704, May 1996.

Lawrence R. Rabiner and Ronald W. Schafer, Digital Processing of Speech Signals, Prentice–Hall, pp. 485–489, 1978.

*Primary Examiner*—David R. Hudspeth
*Assistant Examiner*—Talivaldis Ivars Smits
*Attorney, Agent, or Firm*—Whitham, Curtis, Whitham; Robert P. Tassinari, Jr.

[57] ABSTRACT

Clusters of quantized feature vectors are processed against each other using a threshold distance value to cluster mean values of sets of parameters contained in speaker specific codebooks to form classes of speakers against which feature vectors computed from an arbitrary input speech signal can be compared to identify a speaker class. The number of codebooks considered in the comparison may be thus reduced to limit mixture elements which engender ambiguity and reduce system response speed when the speaker population becomes large. A speaker class processing model which is speaker independent within the class may be trained on one or more members of the class and selected for implementation in a speech recognition processor in accordance with the speaker class recognized to further improve speech recognition to level comparable to that of a speaker dependent model. Formation of speaker classes can be supervised by identification of groups of speakers to be included in the class and the speaker class dependent model trained on members of a respective group.

18 Claims, 1 Drawing Sheet

5,895,447

SPEECH RECOGNITION USING THRESHOLDED SPEAKER CLASS MODEL SELECTION OR MODEL ADAPTATION

CROSS-REFERENCE TO RELATED APPLICATIONS

This application is a continuation-in-part of a provisional U.S. patent application Ser. No. 60/011,058, entitled Speaker Identification System, filed Feb. 2, 1996, priority of which is hereby claimed under 35 U.S.C. §119(e)(1) and which is hereby fully incorporated by reference.

BACKGROUND OF THE INVENTION

1. Field of the Invention

The present invention generally relates to speech and speaker recognition systems and, more particularly, to speech recognition systems supplemented by a speaker recognition system and including signal processing model substitution for use by a potentially large number of speakers.

2. Description of the Prior Art

Many electronic devices require input from a user in order to convey to the device particular information required to determine or perform a desired function or, in a trivially simple case, when a desired function is to be performed as would be indicated by, for example, activation of an on/off switch. When multiple different inputs are possible, a keyboard comprising an array of two or more switches has been the input device of choice in recent years.

However, keyboards of any type have inherent disadvantages. Most evidently, keyboards include a plurality of distributed actuable areas, each generally including moving parts subject to wear and damage and which must be sized to be actuated by a portion of the body unless a stylus or other separate mechanical expedient is employed. Accordingly, in many types of devices, such as input panels for security systems and electronic calculators, the size of the device is often determined by the dimensions of the keypad rather than the electronic contents of the housing. Additionally, numerous keystrokes may be required (e.g. to specify an operation, enter a security code, personal identification number (PIN), etc.) which slows operation and increases the possibility that erroneous actuation may occur. Therefore, use of a keyboard or other manually manipulated input structure requires action which is not optimally natural or expeditious for the user.

In an effort to provide a more naturally usable, convenient and rapid interface and to increase the capabilities thereof, numerous approaches to voice or sound detection and recognition systems have been proposed and implemented with some degree of success. However, variations in acoustic signals, even from a single speaker, which may represent a command, present substantial signal processing difficulties and present the possibility of errors or ambiguity of command understanding by the system which may only be partially avoided by substantial increase of processing complexity and increase of response time.

For example, a simple voice actuated system which relies on template matching of the acoustical content of an utterance theoretically requires a particular word or phrase to be input for each command which can be used by each enrolled (e.g. authorized) user. Therefore, even a moderate number of recognizable commands for each of a moderate number of users can require comparison with a very large number of templates while not guaranteeing successful or accurate voice recognition due to variation of the acoustical signal each time a command may be uttered. Conversely, a speaker independent system would only require enrollment of commands to be recognized and a correspondingly reduced number of template comparisons but accuracy of command recognition or understanding by the system would be severely compromised by additional variation of acoustical signals from speaker to speaker. In continuous speech recognition using Hidden Markov Models (HMM), the speech is usually characterized by a large number of lefemes (portions of phones in a given left and right context). The recognition of an utterance involves aligning the utterance against different hypotheses and computing the likelihood of each hypothesis. In this context, the stochastic distribution of acoustic feature vectors corresponding to each lefeme must be properly modeled. What was said for template matching remains applicable to each lefeme: speaker dependent systems present less variability than speaker independent systems which must account, at the lefeme level, for not only intra-speaker variations but inter-speaker variations as well.

Accordingly, it can be understood that while improved performance can be expected from a speaker dependent system, such improved performance has heretofore only been achieved at the expense of greater processing complexity and memory requirements when the speaker population becomes large. In other words while it is possible to build a speaker dependent model for a small number of users, such a process cannot, as a practical matter, be repeated indefinitely as the speaker population size increases.

That is, as an incident of modelling a lefeme of a speaker, the signal components which represent corresponding acoustic components of the lefeme will have some statistical distribution of parameters (e.g. spectral content, cepstral vector, etc., each having a mean, variance and a weight) even for a single speaker and a single utterance. In general, intra-speaker variability of the acoustic vectors associated to the same lefeme are usually smaller than inter-speaker variability.

Accordingly, when modelling the probability distribution of the likelihood that a particular parameter will, in combination with other parameters, correspond to a particular lefeme, must be modelled as a sum of overlapping distributions (e.g. Gaussian distributions), referred to as mixture components which take into account intra-speaker and inter-speaker signal variations in the system.

As will be readily understood, the sum of non-coincident distributions tends to widen the distribution (e.g. increase the variance) of the resulting distribution reflecting such a sum. Thus, as the number of speakers increases the number of mixture components of a signal, the definition of states of the parameters corresponding to a speaker and/or an utterance degrades.

In systems which rely on matching of templates or any other type of representation of acoustic signals, the increasing variances thus developed tends to cause ambiguity in the matching process. This problem may be compounded in speech recognition systems which are supplemented by speaker recognition and use of speaker dependent signal processing models since lack of success in speaker recognition may prevent the application of any speaker dependent model while an incorrect model may be used if an incorrect speaker is identified. Thus, there is a need to resolve the disadvantages between speaker-dependent and speaker-independent speech recognition systems which have heretofore been considered as mutually exclusive.

SUMMARY OF THE INVENTION

It is therefore an object of the present invention to provide a method and apparatus for reducing computational overhead and storage requirements in speech and speaker recognition systems applied to a large speaker population.

It is another object of the present invention to provide a speaker recognition system capable of supplementing a speech recognition system by implementing specially trained signal processing models with reduced error frequency.

It is a further object of the invention to provide improved performance of a speech recognition system for a large number of speakers while reducing processing complexity and storage requirements.

In order to accomplish these and other objects of the invention, a speaker recognition system is provided including and arrangement for clustering information values representing respective frames of utterances of a plurality of speakers by speaker class in accordance with a threshold value to provide speaker class specific clusters of information, an arrangement for comparing information representing frames of an utterance of a speaker with respective clusters of speaker class specific clusters of information to identify a speaker class, and an arrangement for processing speech information with a speaker class dependent model selected in accordance with an identified speaker class.

In accordance with another aspect of the invention, a method of operating a speech recognition system is provided comprising the steps of identifying a speaker class bar comparing an input speech signal with a stored representation of speech signals corresponding to a speaker class, providing a speaker class dependent speech processing model to the speech recognition system, said speech processing model being speaker independent within a speaker class, and processing the speech signal with the speech processing model thus provided.

In accordance with the invention, using a text-independent speaker recognition system as described in concurrently filed U.S. patent application Ser. No. 08/788,471 (Attorney's Docket Number YO9-96-188), assigned to the assignee of the present invention and hereby fully incorporated by reference, training speakers are clustered into a limited number of speaker classes by performing bottom up clustering on the speaker models. The probability distribution for each lefeme is modeled by training (adapting) a generic model on the training data of all training speakers who belong to that class. Because the intra-class variability is smaller than the inter-speaker variability over a whole population, the complexity of the distributions of each lefeme is reduced and the amount of parameters needed to model these distributions can be significantly reduced without adversely affecting performance.

When recognizing the speech from a speaker, it can either be determined which class characteristics provide the best fit and the model of the class can be used for speech recognition or the class-dependent models (with or without mixture restriction) can be used as initial models to seed a speaker adaptation algorithm to further improve recognition in a supervised or unsupervised manner. Because the class-dependent model is closer to the speaker characteristics than a speaker-independent model would be, less data is required to perform efficient adaptation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
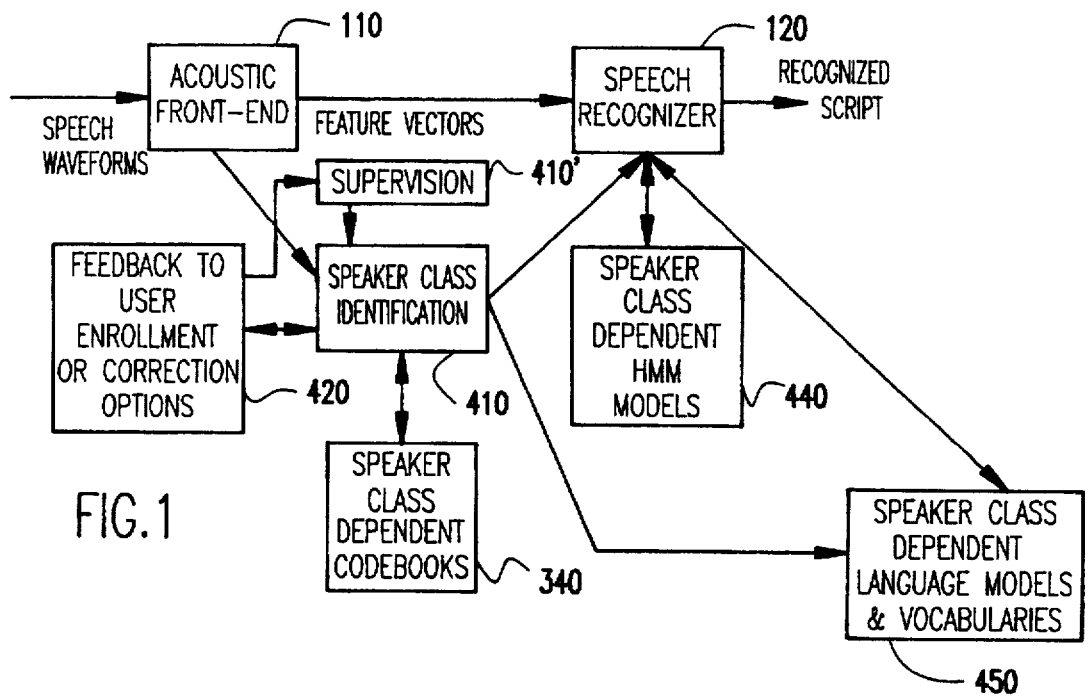
FIG. 1 is a high-level block diagram/flow chart illustrating the overall organization of the invention in a speech recognition system.
Figure 2:
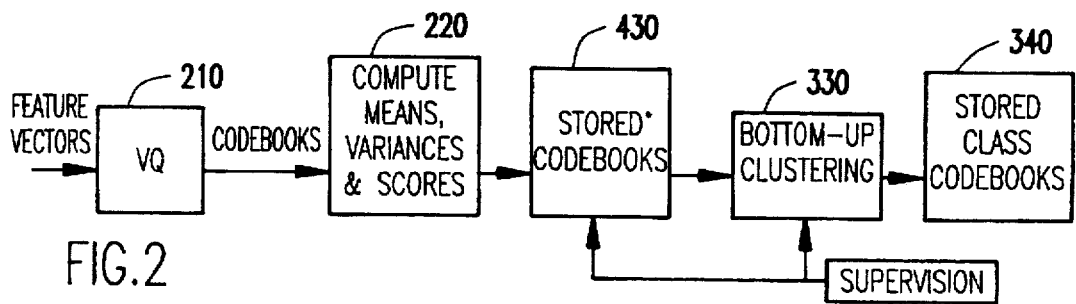
FIG. 2 is a high-level block diagram/flow chart illustrating training of a speaker recognition model in accordance with the invention.

Referring now to the drawings, and more particularly to FIG. 2, there is shown a flow chart illustrating the methodology of a speech recognition system with which the present invention is preferably used. It should be understood that the depiction of the invention in FIG. 1 (and FIGS. 2–3, as well) could be considered as being a high-level block diagram of apparatus 100 for carrying out the invention. In this latter regard, it should be further understood that while the invention is preferably carried out utilizing a suitably programmed general purpose digital computer, the functional elements depicted in the drawings are exemplary of functional elements which would be established within the computer by such programming. The Figures thus also illustrate a suitable and preferred processor architecture for practicing the invention which may be achieved by programming of a general purpose processor.

Figure 3:
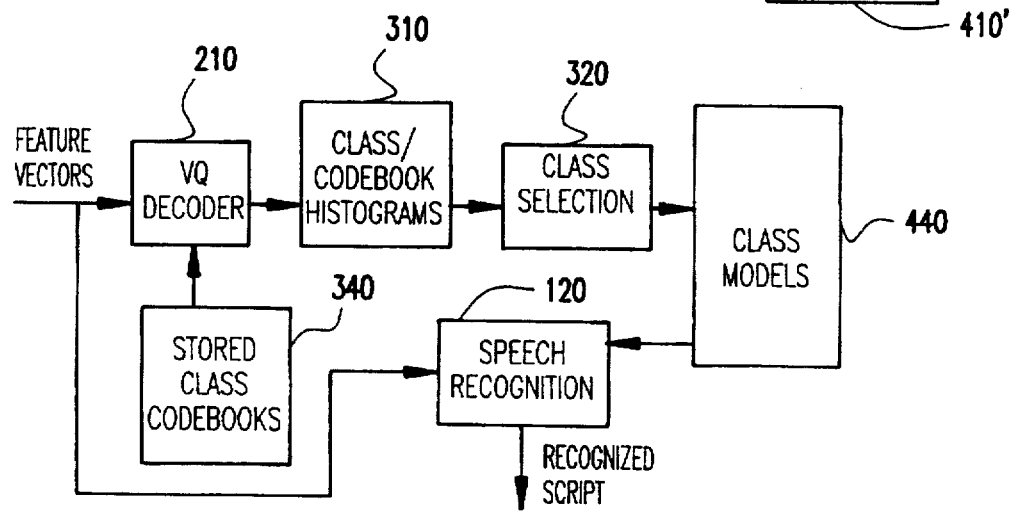
FIG. 3 is a high-level block diagram/flow chart illustrating speaker recognition and model selection as well as preferred additional functions of the invention.

Of course, a special purpose processor configured in the manner depicted in FIGS. 1–3 would be expected to achieve somewhat enhanced performance levels in comparison with a general purpose processor. Nevertheless, a general purpose processor is presently preferred in view of the flexibility which may be provided for inclusion of other processing as may be desired.

It should also be clearly understood that while the preferred form of speaker class recognition will be described below in connection with FIG. 1, the practice of the invention and realization of the basic meritorious effects thereof does not rely on any particular form of speaker recognition or speech recognition. For example, to provide speaker class recognition, template matching against a single template of an utterance used to invoke the system for each enrolled speaker or class of enrolled users could achieve speaker class recognition and the speaker class identification thus achieved could then be used for practice of the remainder of the methodology of the invention. By the same token, a signal processing model could be trained on a single speaker as representative of a class of speakers since clustering limits the inter-speaker variations and also limits the requirements for training data within a given class.

The preferred, text independent form of speaker class recognition system in accordance with the invention preferably utilizes feature vectors developed by an acoustic front end 110. Such feature vectors are preferably computed on overlapping 30 msec. frames with shifts of 10 msec. Physiologically related MEL cepstra, delta and delta-delta feature vectors are preferred as feature vectors for efficiency and effectiveness of speaker identification or verification although other known types of feature vectors could be used. Such feature vectors and others, such as LPC cepstra, are thirty-nine dimension vectors in the case of the preferred embodiment, as is well-understood in the art, but other dimensions could be used to achieve the same meritorious effects in accordance with the principles of the invention.

In any case, the development of such feature vectors from an input signal is purely a function of the speech recognizer 120 and need not be separately provided for speaker recognition in accordance with the present invention. By the same token, the particulars of speech recognizer 120 are not critical to the practice of the invention. It is, however, convenient and preferred for speaker class recognition to utilize feature vectors which are available although feature vectors may also be separately derived in the practice of the present invention.

A minimum of information specific to the voice of an enrolled speaker or a class of speakers (which can be represented by a single speaker or a plurality of speakers less than or equal to the number of speakers of the class) is accumulated and stored in codebooks 430 in the form of a set of about sixty-five clustered feature vectors and variances which are captured under control of the speaker recognition processor 410 as each new speaker is enrolled, as will be discussed in detail below with reference to FIG. 2. As each feature vector is captured during enrollment, feedback is preferably provided to a user through any convenient device such as a display, indicator, annunciator or printer, as indicated at 420. While feedback element 420 is not necessary to the practice of the invention, it is preferably arranged to provide an indication when speaker recognition is not successful and thus provide, through a menu or the like, an interface by which the user is presented with the option of enrollment of a new speaker and to facilitate initiating of such a procedure. During enrollment, the feedback element is also preferably arranged to provide an indication of whether or not the system has received an adequate amount of speech for speech adaptation of a speaker class dependent speech recognition processing model.

When a speaker uses the system, the acoustic features of any utterance are computed and simultaneously provided to the speaker identification system 410 of the present invention and the speech recognizer 120. Referring briefly to FIG. 3, as well, the testing or speaker class identification phase during use of the invention is preferably implemented with a vector quantizer decoder. On a frame-by-frame basis, the vector quantizer decoder included in speaker identification processor 410 identifies the closest codebook or ranks the closest codebooks by comparison of the feature vector computed from the frame with the mean values and variances of the clusters of feature vectors which comprise codewords of each codebook.

A histogram is thus developed at element 310 which counts or accumulates how many frames have selected each codebook; the codebook most often selected identifying the potential speaker class, as indicated at 320 of FIG. 3. By the same token, the average distance of the vector parameters from the closest codebook allows detection (e.g. based on an empirically or adaptively derived threshold) of new speakers not sufficiently identifiable with an existing class and, if desired, the user may then be prompted with an enrollment menu and a further codebook developed to represent a further speaker class.

Once a speaker class is identified, as described above, speaker class identification element 410 can control the loading of a speaker class dependent model (but which is functionally speaker independent within the class), in any form such as the well-understood Hidden Markov Model (HMM), special language models, grammar, vocabularies, dictionaries, lists of names, languages or the like which are specific to the identified class of speakers for the speech recognition element 120 of the system. Such speaker class specific/dependent models (which may be adaptively trained in a well-understood manner) and other information is thus made available to improve accuracy of speech recognition to a level comparable to that obtained using an individual speaker dependent model. Further, loading of such speaker class dependent information serves to limit the data against which the utterance must be matched or compared to reduce processing overhead and response time. If no enrolled speaker class is identified, a generic, speaker independent set of models is loaded as a default.

Referring again to FIG. 2, the development of speaker classes as a part of the training process will now be discussed. It should be kept in mind during the following discussion that speaker class identification and development are both performed completely independently of any speech recognition. Initially, during enrollment or training, feature vectors to be stored as codewords in codebooks are developed for each speaker within a class for each training speaker. During enrollment, feature vectors corresponding to sampled frames of arbitrary (but preferably prompted) utterances are computed by the vector quantizer 210 included in the speaker identification processor 410 of FIG. 1. These feature vectors are then clustered into about sixty-five codewords, each codeword being built from the most closely corresponding feature vectors and characterized by the mean and variances of each cluster of feature vector parameters. The groups of codewords are stored as codebooks 430. The number of codewords in a codebook is not at all critical to the practice of the invention but groups of codewords numbering about sixty-five is computationally convenient while representing a sufficient variety of speaker utterances for acceptably consistent and accurate speaker identification.

Likewise the number of speaker specific codebooks is theoretically limited only by available storage and the storage space required for each codebook is relatively small to accommodate a large plurality of speakers. Each codebook effectively condenses information concerning a large number of utterances into a statistical description of clusters of those utterances.

Nevertheless, the clustering of codebooks into classes in accordance with the invention, as will be described below, effectively further condenses the speaker specific codebooks into a much smaller number of speaker class specific codebooks and the processing of a large number of speaker specific codebooks need be done only once to reduce the number of speaker class specific codebooks to a sufficiently small number to allow acceptable levels of system performance thereafter. Additionally, the processing of speaker specific codebooks can be performed on a suitably small number of speaker specific codebooks to establish one or more initial classes in an acceptably short period of time so that further enrollments of speakers can be processed against codebooks representing a small number of existing classes, so developed, and additional classes developed only as needed. When a new class is found to be needed and developed, previously existing classes are unaffected.

To develop speaker class specific codebooks, the mean values contained in the speaker specific codebooks are processed against each other and again clustered, using a distance measure (e.g. along a Mahalanobis distance which is a weighted Euclidian distance in which weights are assigned according to the inverse of the variances of each of the dimensions or parameters of the feature vector, or a probabilistic distance where the distance is the log-likelihood of the Gaussian function associated to the codeword, having the same mean and variance as the corresponding feature vector parameter), as depicted at 330 of FIG. 2, into a set of about sixty-five speaker class specific codewords for each speaker class specific codebook. Alternatively, the data used to build the codebooks of each of the speakers can be pooled together and re-clustered to obtain the class codebook. Since the speaker specific codebooks are processed against each other, this process is referred to as bottom-up clustering to distinguish the process from clustering of speaker specific clustering during enrollment. The speaker class specific codebooks are then stored as depicted at 340 of FIG. 2. The number of speaker class specific codewords in each speaker class specific codebook is, similarly to the speaker specific codebooks, non-critical to the practice of the invention. The distance between codewords is typically obtained by computing the average distance of the codewords of one codebook to the closest codeword in the other codebook, usually averaged with the distance obtained by permuting the role of the codebooks. Use of a threshold distance determines which speaker specific codebooks are sufficiently close to be so clustered into a codebook representing a single speaker class.

Referring now to FIG. 3, the operation of the preferred embodiment of the invention during use of the system will be further described. Use of the system is also referred to as a testing phase of operation to distinguish it from the training/enrollment phase (although further adaptive training can occur during system use which the term is also considered to reflect) and because feature vectors computed from signals representing utterances of a speaker are tested against information stored in the codebooks 340 depicted in FIGS. 1–3.

Depending on the application and the delay in speaker identification which may be tolerable, the speech recognition system 120 (FIG. 1) may start operation in a speaker independent mode. Alternatively, if a few seconds of delay are tolerable, operation of the speech recognition may be suppressed until a speaker class has been at least tentatively identified. Generally, in the practice of the invention, a peak of the histogram or other significant divergence of selected codebook counts, as depicted at 310 of FIG. 3, will be developed and detected to provide speaker class selection, as depicted at 320 of FIG. 3, after about three seconds of speech, allowing a speaker class dependent model 440 to be implemented in the speech recognizer 120 for processing of the input feature vectors representing the input utterance. If no tentative decision as to the potentially identified speaker is made by that point, a speaker independent model may be implemented. A final decision of speaker class identity (or a final determination that no enrolled speaker class can be identified) can generally be made at a high confidence level after five to ten seconds.

It is preferred, but not necessary that the speaker class identity determination be provided to the user (e.g. by display, annunciator, etc., possibly as a greeting message) as feedback 420, alluded to above, to allow correction of the selection, retraining or further training 260 of the codebook by capture of further, current frames and computation of corresponding feature vectors. Failure of speaker class selection is preferably fed back to a user whether or not indication of successful speaker class selection is provided. Failure of speaker class selection is preferably indicated by presentation of an enrollment menu to the user and, if enrollment is begun, a new speaker class will be developed and training of a new class model is begun on the new speaker. If new enrollment is not possible, a speaker-independent model is used for the speech recognition.

It should be understood that the invention provides a relatively small number of speaker class specific codebooks.

It therefore follows that definition of states for the speaker class is not significantly degraded and a speaker class can be usually identified quickly and unambiguously. Therefore, it is not generally considered to provide consistency checks to confirm or reject the speaker class identification achieved in accordance with the invention, such as that disclosed in concurrently filed U.S. patent application Ser. No. 08,789, 029 (Attorney's Docket No. YO9-96-204) which is assigned to the assignee of the present invention and hereby fully incorporated by reference.

As disclosed therein, the speaker recognition processing can be accelerated and ambiguous speaker recognition avoided by using consistency checks. Thus, to the extent that the number of speaker classes developed may adversely affect system performance, such consistency checks can be employed to advantage in evaluating preliminary speaker class selection in the present invention. Inclusion of such consistency checks may also be useful as the initial few classes of speakers are developed as described above to reject marginal clustering and encourage development of new classes.

Alternatively, such consistency checks can be employed for evaluating or refining the threshold value by which classes are separated since such consistency checks allow values or sets of values marginally within a threshold distance to be rejected from the class. Thus, use of consistency checks such as those described in the above-incorporated application can determine if significant separation or definition of classes (e.g. for reduction of speaker class recognition ambiguity) could be achieved by reduction of threshold distance from any particular value currently in use.

In view of the foregoing, it is evident that the system and method of the invention described above provides a method and apparatus for reducing computational overhead and memory requirements in speech and speaker recognition systems applied to a large speaker population by condensing utterances into clusters of statistical descriptions of mean values of information contained in speaker specific codebooks in accordance with closely matched classes of speakers. Improved speech recognition is achieved to a degree comparable to speaker dependent systems by implementing signal processing models trained on utterances of speakers by class for processing of an input speech signal. Processing complexity and storage requirements are reduced by the reduction of the amount of information with which input information must be compared when the speaker population becomes large.

Also, models adapted to a class can be used to seed the models used for speaker adaptation for new speakers associated to that class. In other words, once a speaker is associated to a class, a model can be adapted to this speaker without starting from a generic (classically, often speaker-independent) model but, rather, starting from an already more adapted class model. These meritorious effects and other benefits of the invention, while preferably implemented as a clustering of codebooks which, in turn, represent a clustering of feature vectors, do not rely on the details of the codebooks or the information or clustering which may have been accomplished in their development but may be accomplished on any suitable set of data in which sets of mean or average values can be correlated and expressed in a condensed form by a reduced number of statistical descriptions thereof.

As examples of extreme cases of application of the principles of the invention, it is possible to supervise the clustering into classes during enrollment as indicated at 410' of FIGS. 1 and 2. That is, during training, the classes are not decided automatically by the system but enforced (e.g. by a system administrator or developer) by presenting two or more classes to the clustering algorithms. For example, classes can be built using only male or female speakers, respectively, to build gender-dependent codebooks and models for speech recognition each using only the data from speakers of the respective enforced class. Similarly, by building classes of speakers who use the same dialect, accent or national origin or primary language, it is possible to increase the efficiency of the system by systematically identifying the specificity of the class to build the codebooks using only data from a given class and adapting models on training data within the class. During recognition, the class is identified in an unsupervised way as previously described and the appropriate models are used for recognition or unsupervised adaptation.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A speech processing system including
   means for clustering information values representing respective frames of utterances of a plurality of speakers by speaker class in accordance with a threshold value to provide speaker class specific clusters of information,
   means for comparing information representing frames of an utterance of a speaker with respective clusters of said speaker class specific clusters of information to identify a speaker class, and
   means for processing speech information with a speaker class dependent model selected in accordance with a speaker class identified by said means for comparing information.

2. A system as recited in claim 1, further including
   means for supervising a class with which a speaker may be associated,
   wherein said means for clustering is responsive to said means for supervising.

3. A system as recited in claim 2, further including
   means for training said speaker class dependent model in accordance with codebooks corresponding to speakers in a class identified by said means for supervising.

4. A system as recited in claim 3, wherein said codebooks of a speaker class are adapted in response to a speaker class dependent model.

5. A system as recited in claim 1, wherein said means for comparing includes
   means for sampling frames of said input speech signal,
   means for computing a feature vectors from frames of said input speech signal,
   means for comparing parameters of ones of said feature vectors computed in said computing step with said stored mean and variance values to derive a score, and
   means for counting the number of feature vectors which correspond to each said codebook responsive to said means for comparing parameters.

6. A system as recited in claim 1, wherein said means for comparing information includes means for pattern recognition.

7. A system as recited in claim 1, further including
   means for processing said speech information in accordance with a speaker independent model prior to completion of identification of a class by said means for comparing information.

8. A system as recited in claim 7, further including
   means for processing said speech information in accordance with a speaker dependent model subsequent to completion of identification of a class by said means for comparing information.

9. A method of operating a speech recognition system, said method comprising the steps of
   identifying a speaker class by comparing an input speech signal with a stored representation of speech signals corresponding to a speaker class, in accordance with a threshold value,
   providing a speaker class dependent speech processing model to said speech recognition system in accordance with results of said identifying step, said speech processing model being speaker independent within a speaker class, and
   processing said speech signal with said speech processing model.

10. A method as recited in claim 9, wherein said stored representation of speech signals includes a plurality of codebooks, each codebook including a plurality of codewords comprising mean and variance values of parameters of clusters of feature vectors computed from frames of speech signals corresponding to an enrolled speaker and wherein said identifying step includes the steps of
    sampling frames of said input speech signal,
    computing a feature vectors from frames of said input speech signal,
    comparing parameters of ones of said feature vectors computed in said computing step with said stored mean and variance values to derive a score, and
    counting the number of feature vectors which correspond to each said codebook in accordance with results of said step of comparing parameters.

11. A method as recited in claim 9, wherein said identifying step includes a template matching process.

12. A method as recited in claim 9, including the further step of
    processing said speech signal in accordance with a speaker independent model prior to completion of said identifying step.

13. A method as recited in claim 9, including the further step of
    processing said speech signal in accordance with a speaker dependent model subsequent to completion of said identifying step.

14. A method as recited in claim 9, including the further step of
    processing said speech signal in accordance with a speaker independent model subsequent to completion of said identifying step when said identifying step does not identify an enrolled speaker.

15. A method as recited in claim 9, including the further step of
    forming said stored representation of speech signals corresponding to a speaker class by clustering of codewords.

16. A method as recited in claim 15, including the further step of
    supervising formation of said stored representation by identifying codewords which can be clustered by identification of a group of speakers.

17. A method as recited in claim 16, including the further step of a consistency check to accept or reject the identified class.

18. A method as recited in claim 16, including the further step of adapting said stored representation of speech signals corresponding to a class using said speaker class dependent speech processing model.

* * * * *